OSCAR F. RUIZ
INVENTOR

Huebner & Worrel
ATTORNEYS

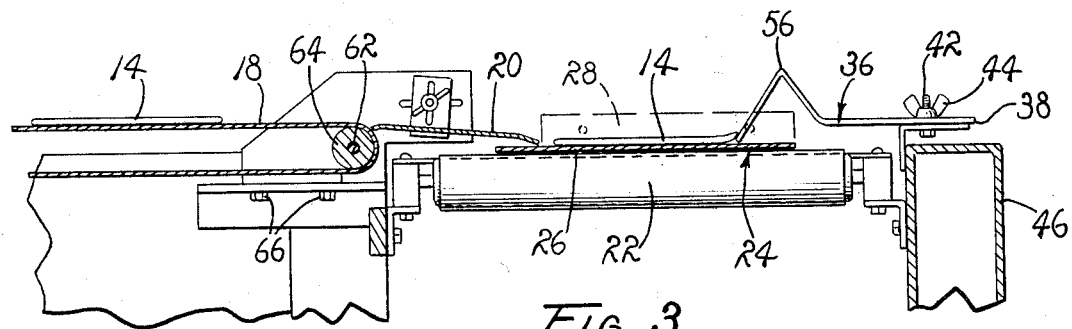
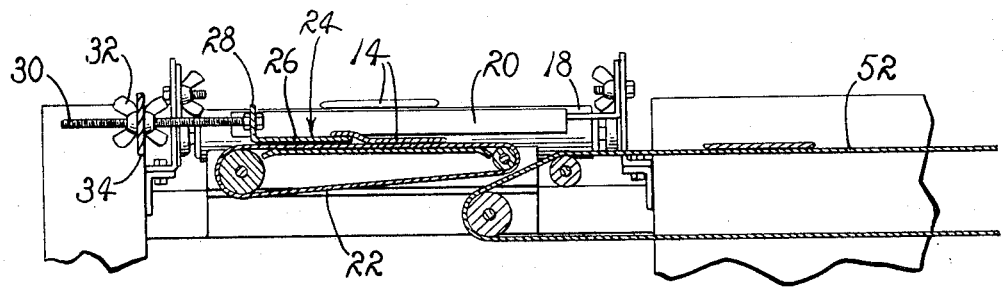

United States Patent Office 3,440,974
Patented Apr. 29, 1969

3,440,974
ARTICLE HANDLING AND POSITIONING
APPARATUS
Oscar F. Ruiz, P.O. Box 1253,
Tulare, Calif. 73274
Filed Oct. 21, 1966, Ser. No. 588,496
Int. Cl. A21c 3/00
U.S. Cl. 107—12                                    10 Claims

ABSTRACT OF THE DISCLOSURE

Apparatus for orienting elliptical pieces of dough including first and second traveling belt conveyors right angularly related, a ramp plate bridging a gap between the conveyors, and a friction plate having an edge extending obliquely from the ramp plate across the second conveyor in the direction of movement thereof, the dough pieces being discharged by the first conveyor across the ramp plate and onto the second conveyor with sufficient velocity to be substantially centrally positioned thereon and with a leading portion of the dough piece marginally overlapping the friction plate and the trailing portion thereof supported on the second conveyor.

---

The present invention relates to an article handling and positioning apparatus and more secifically to dough positioning apparatus utilized, for example, in the orienting of pieces of dough for shaping purposes.

Such utilization is typified by the automatic positioning of dough for successive rolling operations in the formation of circular tortillas. Initially, tortillas were shaped into a generally cicular configuration by hand rolling operations. While entirely satisfactory for home production, such tedious procedure was inadequate for economical quantity production. The applicant's United States Patent No. 2,907,286, issued Oct. 6, 1959, related to a highly successful automated apparatus which positioned pieces of dough for shaping purposes. The present invention is a further improvement or refinement of such apparatus.

The present invention pertains principally to a mechanism or apparatus for automatically shaping pieces of dough into generally circular configuration, in a manner which is completely automated and which takes a ball of dough and through a process of sequential steps forms it into a flat patty.

In accordance with the teachings of the present invention a ball of dough, whether it be of white flour or corn flour, is initially processed between rolls which form it into a generally elliptical shape, and the present invention is primarily concerned with a subsequent realignment or repositioning of this elliptical piece for a substantial operation of rolling, which results in a substantially circular configuration of the dough material.

Additional objects and advantages of the present invention will be more readily apparent from the following detailed description of an embodiment of the invention when taken together wtih the accompanying drawings in which:

FIG. 3 is a fragmentary sectional view taken on line 3—3 of FIG. 2; and

FIG. 4 is a fragmentary sectional view taken on line 4—4 of FIG. 2.

Figure 1:
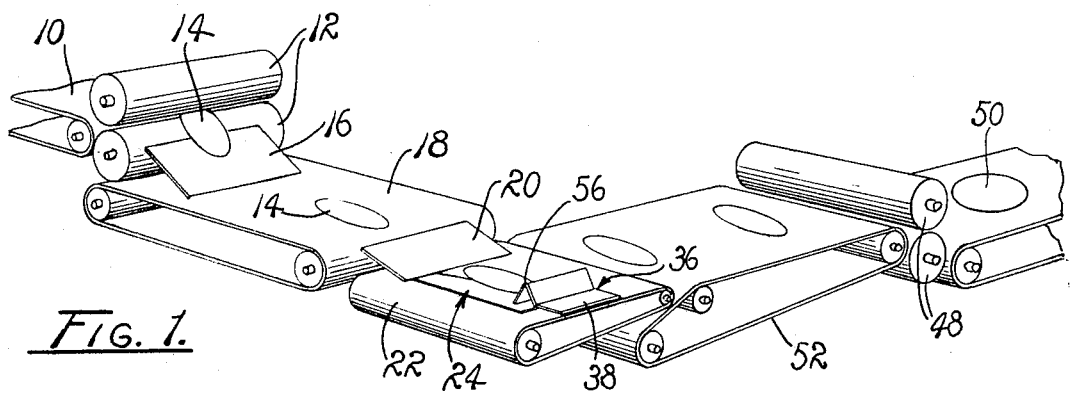
FIG. 1 is a fragmentary schematic view of apparatus in accordance with the present invention.

Referring now in more detail to the drawings, a preformed ball of dough is carried on a dough ball conveyor 10 from a preforming station, and is passed into and through a set of juxtaposed rollers 12 where the ball of dough is flattened and, due to the direction of movement between the rollers, is formed into a flat dough portion of substantially elliptical configuration, as shown at 14. The so-formed dough portion passes down a ramp 16 onto a conveyor 18 which is moving in the same direction as the conveyor 10. From this conveyor 18 the partially shaped dough portion passes over and down a plate or ramp 20 to be deposited upon an auxiliary conveyor 22, which is positioned at a right angle to conveyors 10 and 18.

Figure 2:
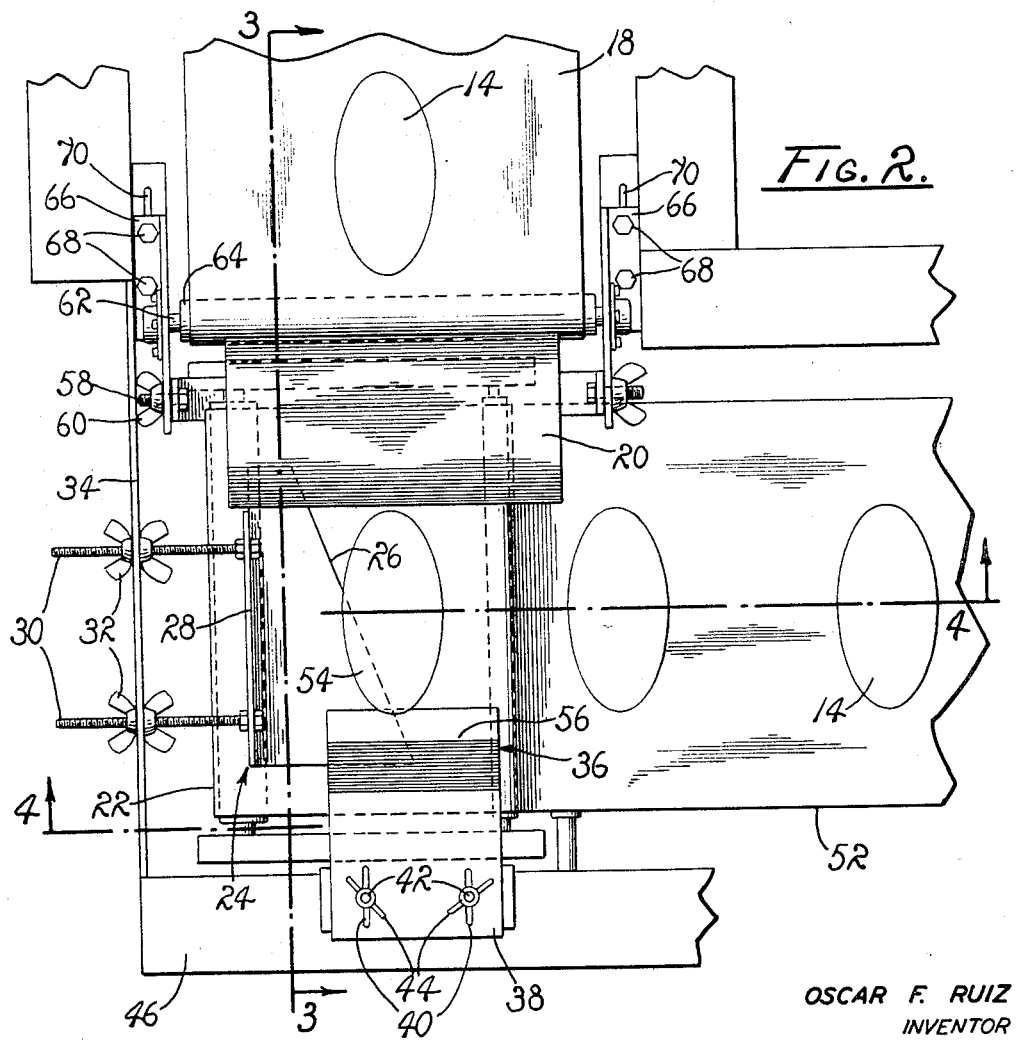
FIG. 2 is a fragmentary plan view of a portion of the apparatus of FIG. 1.

In order properly to position the partially formed dough portion for subsequent operations, and in order to prevent a misalignment or twisting of the dough portion due to movement of the conveyor 22, there is provided a dough portion position controlling friction plate, generally designated 24, which is of the essence of the present invention. This friction plate is generally truncated triangularly shaped and juxtaposed over the conveyor 22, with the smaller end thereof in proximity to the plate 20, and has an oblique edge 26 facing and extending in the direction of movement of the upper run of the conveyor, as shown in FIG. 2. An upstanding end 28 is formed on the plate for coaction with positioning screws or bolts 30, which are operable adjustably to position the plate by means of wing nuts 32 or the like coacting with the frame portion 34 of the apparatus in an obvious manner.

In operation, the partially formed or shaped dough portion has a sufficient velocity imparted thereto by the conveyor 18 to pass down ramp or plate 20, and to be substantially centrally positioned on auxiliary conveyor 22 due to its inertia. Friction during this passage of the dough material is overcome or obviated by means of the inertia of the material. It is desirable, however, that the partially formed dough portion be centrally located with respect to the auxiliary conveyor, and for this purpose a supplementary plate 36 is provided having a flat portion 38 with slots 40 therein through which bolts 42 pass, and on which wing nuts 44 are operatively connected so as to permit securement and positioning of the supplementary plate 36 on and with respect to the frame of the machine as indicated at 46.

During operation of the machine the direction of movement of the partially formed elliptical shaped dough portion is changed in such a manner as to move at substantially right angles to the initial preshaping operation, for subsequent passage through a second set of rollers 48 which so operate on the preformed elliptical dough portion as to result in a substantially circular tortilla or other dough shell, as indicated at 50, which is the desired configuration. In changing the direction of movement it is necessary to utilize not only the auxiliary conveyor 22, but a secondary conveyor 52 onto which the elliptical preformed dough portion is transferred from the auxiliary conveyor, which serves to change its direction of movement.

In the absence of the dough portion position controlling friction plate 24, because of movement of the conveyor 22 and the tendency of the dough frictionally to adhere to the conveyor, there would be a resultant misalignment of the dough portion, with that end thereof which first encounters the surface of the conveyor 22 moving therewith, and the trailing edge being angularly delayed with a consequent misalignment of the piece of dough. The edge 26 of the triangular plate of the present invention however is partially encountered by the leading edge of the preformed elliptical shaped dough portion, as shown in FIG. 2, as at 54 which prevents engagement with and serves as a restraining member for the leading edge of the dough portion until such time as the entire dough portion is placed upon auxiliary conveyor 22. Additionally, in order medially to align the dough portion, the supplementary plate 36 has a triangular raised area 56 which prevents forward movement of the dough portion, and properly disposes or positions it with respect to the secondary conveyor 52. The frictional contact or engagement of the leading edge of the dough portion is just sufficient to delay movement of this leading edge until the trailing edge is fully contacted with and upon the auxiliary conveyor 22. Subsequently the entire dough portion is moved by auxiliary conveyor 22 in a direction at right angles so that on conveyor 18, for placement on conveyor 52 for movement into and through the rollers 48, where the preformed dough is again acted upon under pressure to reshape or reform the same into the generally circular configuration, as indicated at 50.

It has been found that proper alignment and positioning of the dough pieces to be formed is of significance in an automated system for forming tortilla shells and the like. To this end means, including bolts 58 and wing nuts 60, are operatively associated with the discharge end of conveyor 18 properly to align the same, and shaft 62 which carries the trailing end roller 64 for conveyor 18 is also adjustably positioned by coaction of support plate 66, bolts 68 and slots 70 in an obvious manner.

The operation of the present invention will be apparent from the foregoing description of an embodiment thereof, and it will be seen that a dough ball which has been passed through a first set of rollers which preform it into a substantially elliptical shape, is then transferred by virtue of auxiliary conveyors onto a secondary conveyor for movement at right angles to the initial direction of movement for subsequent passage through a second set of forming rollers. The latter rollers operate to form the dough into a substantially circular configuration which is the desirable tortilla shell shape. Misalignment of the preformed dough portion is prevented, and therefore the dough portion is presented to the second set of rollers in a precise manner, by means of the dough portion position controlling friction plate which acts to restrain the leading edge of the dough portion with respect to the auxiliary or transfer and repositioning conveyor.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. An article handling and positioning apparatus comprising a conveyor having an upper run traveled in a predetermined direction, a friction plate mounted above the upper run of the conveyor in overlying relation thereto having a receiving edge disposed obliquely to said direction of travel, and means delivering articles having predetermined longitudinal and tranverse dimensions of reference successively longitudinally onto the conveyor along a line of delivery transversely of the conveyor and in a manner disposing the leading portion of the article in marginally overlapping relation to the oblique edge of the friction plate with the remainder of the article supported by the conveyor, whereby frictional engagement between the articles and the plate disposes the articles with their longitudinal dimensions transversely of the conveyor.

2. The apparatus of claim 1 in which the receiving edge extends from the delivering means transversely of the conveyor and in the direction of travel thereof.

3. The apparatus of claim 2 in which the friction plate is generally triangular and has a stop member at an end thereof distal from the delivering means.

4. An article handling and positioning apparatus comprising a first conveyor for a said article and having a discharge end, a second article conveyor positioned at the discharge end of said first conveyor and so disposed as to run at right angles to the direction of movement of said first conveyor, said second conveyor being adapted to receive an article from said first conveyor disposed in one direction and change the direction of movement in a path ninety degrees with respect to the direction of movement on said first conveyor, a plate juxtaposed over the upper run of said second conveyor and having a receiving edge facing in the direction of movement of the second conveyor and extending thereacross obliquely from a first point proximal to the discharge end of the first conveyor to a second point distal from the first point in the direction of movement of the second conveyor, said edge being adapted for impingement thereon of a leading edge of an article discharged from said first conveyor onto said second conveyor, to thereby retard movement of the article in the second direction of travel until substantially the entire article is supported on said second conveyor, to thereby control the positioning of the article on said second conveyor and its path of travel on said second conveyor.

5. Apparatus as claimed in claim 4 adapted for formation of a substantially flat circular piece of dough, and including a first set of rollers positioned adjacent the leading edge of said first conveyor, adapted for flattening a piece of dough and forming the same into a substantially elliptical configuration, with movement on said first conveyor being in the direction of the major axis of the elliptical dough piece, and with movement on said second conveyor being in the direction of the minor axis of the elliptical dough piece.

6. Apparatus as claimed in claim 4, wherein said plate comprises a dough positioning controlling friction plate of a generally truncated triangular shape, having the smaller end thereof in proximity to the discharge end of said first conveyor, to thereby prevent engagement with the leading edge of an elliptical shaped piece of dough immediately upon being discharged from said first conveyor.

7. Apparatus as claimed in claim 6, and further including an upstanding triangular shaped stop member for determining the movement of an elliptical shaped dough piece discharged from said first conveyor onto said second conveyor, to substantially centrally locate said elliptical dough piece with respect to said second conveyor.

8. In an apparatus in which it is desired to transfer flat pieces of dough from a primary conveyor to a secondary conveyor with the pieces of dough disposed thereon in substantially right angular displacement from their positions on the primary conveyor; the combination of an elongated primary conveyor having an upper run adapted to be moved toward a discharge end thereof, means for delivering pieces of dough to the upper run of the primary conveyor in predetermined orientation with respect to the direction of travel thereof, a secondary conveyor disposed below the discharge end of the primary conveyor and having an upper run adapted to be moved in a direction in substantially right angular relation to the upper run of the primary conveyor, and a friction plate extended transversely of the secondary conveyor having a receiving edge obliquely disposed to the upper runs of both conveyors and extending from the primary conveyor in the direction of movement of the upper run of the secondary conveyor, said primary conveyor being adapted to deliver successive pieces of dough to the secondary conveyor in marginally overlapping relation to the receiving edge of the friction plate whereby frictional engagement between the pieces of dough on the secondary conveyor and the portions thereof overlapping the friction plate edge dispose the pieces of dough on the secondary conveyor in substantial parallelism to their previous positions on the primary conveyor.

9. The apparatus of claim 8 in which the friction plate is of generally triangular shape having a base end spaced from the primary conveyor.

10. The apparatus of claim 9 in which the base end of the friction plate has a stop member associated therewith.

References Cited

UNITED STATES PATENTS

| | | | |
|---|---|---|---|
| 1,669,220 | 5/1928 | Thropp et al. | 198—20 X |
| 2,804,026 | 8/1957 | Boston | 107—12 |
| 2,965,047 | 12/1960 | S.ickelber | 107—12 |

WALTER A. SCHEEL, *Primary Examiner.*

JOSEPH SHEA, *Assistant Examiner.*

U.S. Cl. X.R.

198—20